No. 853,529. PATENTED MAY 14, 1907.
E. F. WELCH.
PLATE LIFTER.
APPLICATION FILED NOV. 20, 1906.
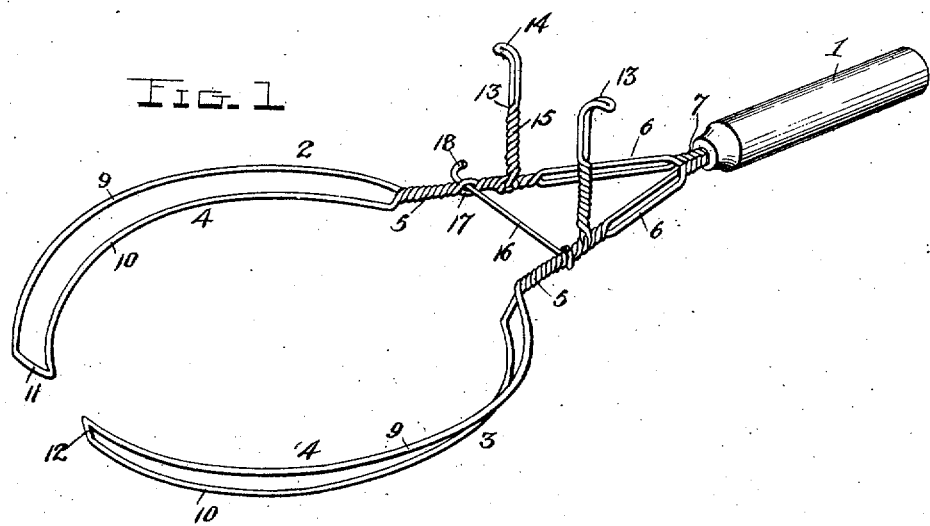
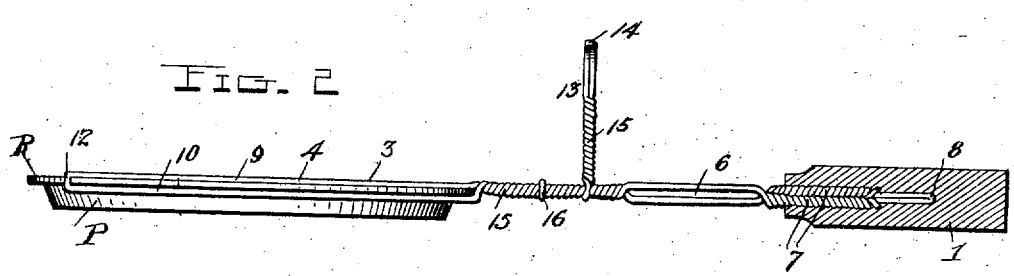
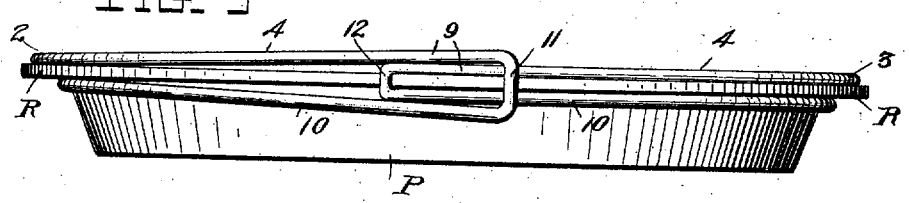
Witnesses
J. A. Griesbauer Jr.
A. M. Rawlings.
Inventor
Edmund F. Welch
by Watson E. Coleman
Attorney

UNITED STATES PATENT OFFICE.

EDMUND F. WELCH, OF TERMO STATION, CALIFORNIA.

PLATE-LIFTER.

No. 853,529.      Specification of Letters Patent.      Patented May 14, 1907.

Application filed November 20, 1906. Serial No. 344,290.

*To all whom it may concern:*

Be it known that I, EDMUND F. WELCH, a citizen of the United States, residing at Termo Station, in the county of Lassen and State of California, have invented certain new and useful Improvements in Plate-Lifters, of which the following is a specification, reference being had therein to the accompanying drawing.

My invention relates to improvements in devices for lifting and handling pie plates, dishes, pans and the like.

The object of the invention is to provide a device of this character which is simple and comparatively inexpensive in construction, which may be used upon pans and the like of various sizes and which is easy to manipulate so that pans and dishes may be quickly lifted into and out of a hot oven.

Further objects and advantages of the invention as well as the structural features by means of which these objects are attained, will be made clear by an examination of the following specification taken in connection with the accompanying drawings, in which, Figure 1 is a perspective view of my improved lifting device; Fig. 2 is a side elevation of the same showing its jaws engaged with a pie plate or pan and its handle in section; and Fig. 3 is a view on an enlarged scale, showing the manner in which the jaws of the lifter engage a plate or pan comparatively small in diameter.

My improved lifting device comprises a handle 1 preferably of wood and two resilient jaw members 2, 3, formed of steel wire or the like of suitable size. These jaw members are similar in construction and have their inner ends securely fixed in the handle 1 from which they project, as clearly shown in Fig. 1. Each of these jaw members comprises a longitudinally curved or arc-shaped rim engaging jaw 4, a twisted portion 5, an open portion 6 and a twisted portion 7, the latter being at the inner end of the jaw member and being suitably secured in the handle 1. Each of the members 2, 3 is preferably formed from a piece of wire doubled upon itself to form the outer or free end of one of the jaws 4 and then suitably bent and twisted to form said portions 4, 5, 6 and 7 of the member; and if desired both of the members 2, 3 may be formed from a single piece of wire which is doubled upon itself at its center, as shown at 8 in Fig. 2, and each branch or end of it is then bent to form the said members. The twisting of the two strands of wire comprising each of the members at the points 5 and 6, serves to greatly strengthen the same; and leaving the portion 6 of said strands untwisted or in spaced parallel relation renders the members sufficiently resilient to permit them to be sprung together to engage a comparatively small plate or pan. Each of the jaws proper 4 has its strands or portions 9, 10 spaced apart sufficiently to receive the rim R of a pie plate or pan P between them, as clearly shown in Figs. 2 and 3, and it will be observed that the strands or portions 10 of these jaws lie in a horizontal plane beneath that of the strands or portions 9 and further that they lie within the portions 9 so that they engage the bottom of the rim R and the outer side of the pan body, while the portions 9 engage the top of said rim. This construction of the jaws permits them to securely grasp the pan or plate P without regard to the size of the latter. The outer end 11 of one of the jaws 4 is made larger than the corresponding end 12 of the other jaw so that said end 12 may pass within the end 11, as shown in Fig. 3, and thus enable the jaws to more readily grasp pans of comparatively small diameter.

Projecting upwardly and at right-angles from the end portions 5 of the jaw members are handles 13 preferably constructed of pieces of wire doubled upon themselves, as shown at 14, and twisted together as at 15, the twisted ends being interwoven in the twisted portions 5 in any suitable manner. The upper ends 14 of the handles are curved outwardly so that when the two handles 13 are grasped in one hand to draw the jaws 4 together the curved ends 14 engage the top of the hand.

In order to limit the opening of the jaws I provide a wire rod 16 which has one of its ends secured or interwoven in the twisted portion 5 of the member 3 and its other end projecting through an eye or loop 17 formed in the corresponding portion of the member 2, the latter end being bent upon itself to form a stop 18. This cross piece or wire 17 not only serves to limit the separation of the jaws 4, but also to keep the two members in alinement with each other as will be readily understood.

In using the device its two jaws 4 are engaged with the pan rim, as shown in Fig. 2, and the handle 1 is held in one hand while the two handles 13 are grasped by the other hand and drawn together to cause the jaws 4 to securely grip the pan. It will be observed that the peculiar construction and shape of the jaws 4 will permit the device to pick up large or small plates with equal ease and enable it to hold them with equal security. The telescoping of the outer ends of the two jaws, as shown in Fig. 3, permits them to be effectively engaged with pans or plates of very small diameter. It will be furthermore observed that the device is exceedingly simple in construction so that it may be manufactured at a comparatively small cost and that it is durable in use and very easy to manipulate.

Having thus described my invention, what I claim as new and desire to secure by Letters Patent of the United States is:—

1. A plate lifter comprising a handle, resilient jaw members projecting therefrom and each being formed of wire and having the curved jaw 4 composed of spaced strands 9, 10, the twisted portion 5 at the inner end of the jaw, the twisted portion 7 embedded in said handle and the straight portion 6 between the twisted portions 5 and 7, the twisted portion 5 of one of the members having an opening or eye 17, the cross piece 16 fixed at one of its ends in the twisted portion 5 of the other member and projecting through said eye or opening 17, the free end of said cross piece having a stop 18, and the handles 13 carried by said members, substantially as shown and described.

2. A plate lifter comprising a handle, resilient jaw members projecting therefrom and each being formed of wire and having the curved jaw 4 composed of spaced strands 9, 10, the twisted portion 5 at the inner end of the jaw, the twisted portion 7 embedded in said handle and the straight portion 6 between the twisted portions 5 and 7, the twisted portion 5 of one of the members having an opening or eye 17, the cross piece 16 fixed at one of its ends in the twisted portion 5 of the other member and projecting through said eye or opening 17, the free end of said cross piece having the stop 18, and the handles 13 projecting upwardly from the twisted portions 5 of said members and having their upper portions curved outwardly to form hooks, each of said handles 13 being formed from a single piece of wire bent upon itself at its center and curved to form the upper portion of the handle and having its ends twisted together at 15 and interwoven in the twisted portion 5, of one of said members, substantially as shown and described.

In testimony whereof I hereunto affix my signature in presence of two witnesses.

EDMUND F. WELCH.

Witnesses:
 A. N. WILSON,
 Mrs. A. N. WILSON.